C. BERTI.
MANUFACTURE OF PAPER AND APPARATUS THEREFOR.
APPLICATION FILED FEB. 9, 1907.
932,430.
Patented Aug. 31, 1909.
2 SHEETS—SHEET 1.
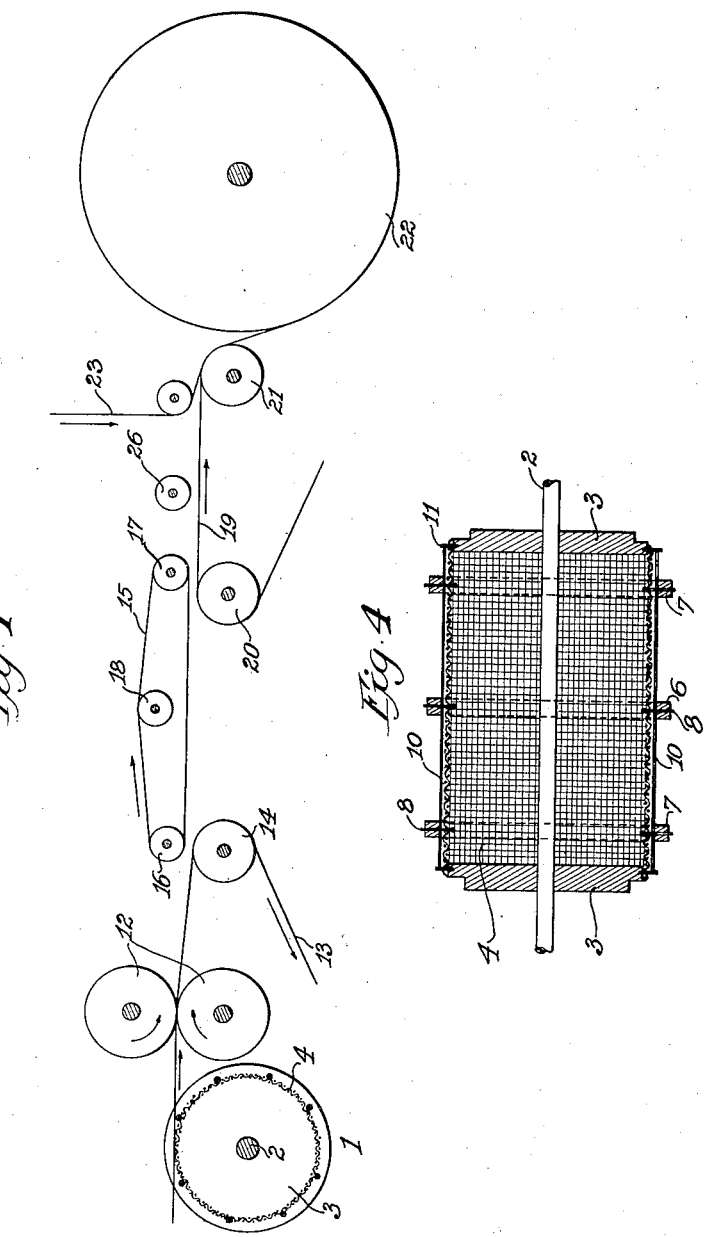
Witnesses:
Inventor:
Ciro Berti
By B. Singer
Atty.

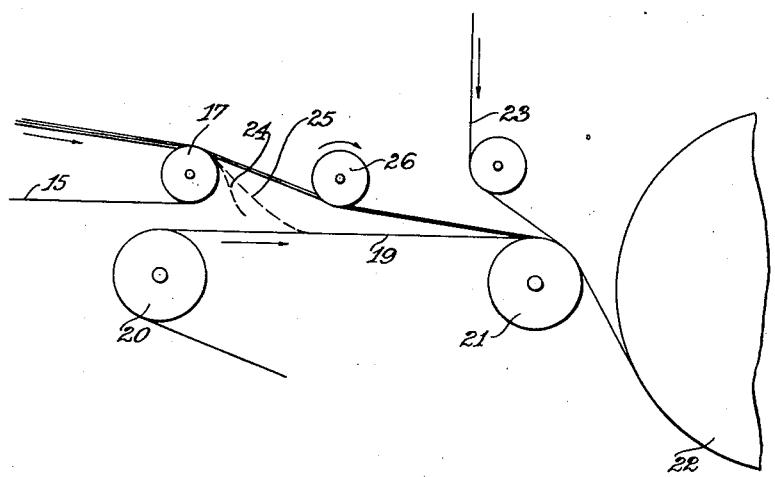
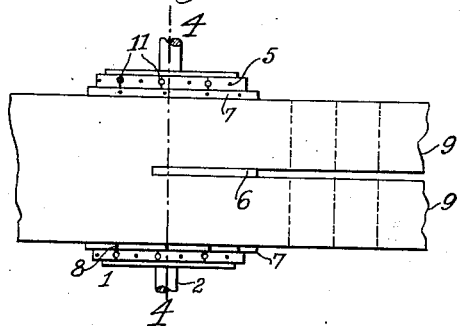
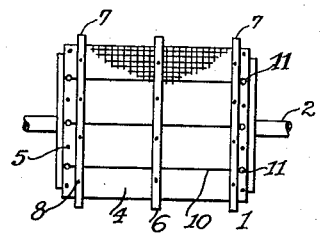

UNITED STATES PATENT OFFICE.

CIRO BERTI, OF VIGNOLA, ITALY.

MANUFACTURE OF PAPER AND APPARATUS THEREFOR.

932,430.

Specification of Letters Patent. Patented Aug. 31, 1909.

Application filed February 9, 1907. Serial No. 356,575.

*To all whom it may concern:*

Be it known that I, CIRO BERTI, subject of the King of Italy, residing at Vignola, near Modena, Italy, have invented new and useful Improvements in the Manufacture of Paper and Apparatus Therefor, of which the following is a specification.

This invention relates to an improved apparatus applicable to cylinder sieve paper machines for dividing and severing paper web into sheets, during the process of manufacture, and the features and objects of the invention will be fully described in connection with the accompanying drawings, and will be more particularly pointed out and ascertained in and by the appended claims.

In the drawings:—Figure 1 is a side elevation of an apparatus receiving the pulp film from the sieve cylinder and delivering it to a drying apparatus. Fig. 2 is an enlarged detailed view of that portion of the apparatus for severing the web into sheets. Fig. 3 is a detailed plan view showing the webs as they leave the sieve cylinders. Fig. 4 is a sectional view of the sieve cylinder on line 4—4 of Fig. 3. Fig. 5, is an enlarged elevation of the sieve cylinder detached from the apparatus.

Like characters of reference designate similar parts throughout the different figures of the drawings.

The sieve cylinder is indicated as a whole by 1, and is mounted upon a shaft 2. Said cylinder may comprise disks 3, secured on the shaft 1, and adapted to carry on their periphery a cylindrical sieve 4. The sieve 4 may be secured to the disks 3 by any suitable fastening devices such as brads 5. The sieve 4 is provided with annular flanges 6 and 7, formed of rubber or similar material, and secured upon the sieve by fastening devices such as wire pins 8, as clearly shown in Fig. 4. The flanges 7 are disposed on the sieve 4 near the ends thereof and the flange 6 is disposed centrally of the ends. The pulp film is formed on the surface of the sieve 4, between the flanges 7, and as it is formed it is longitudinally divided into webs 9 by the flange 6.

Beneath the flanges 6 and 7, and disposed upon the periphery of the sieve 4 are a plurality of elements, preferably consisting of cords 10 arranged in parallel relation and longitudinally of the sieve cylinder. Said cords extend beneath the flanges 6 and 7 and are pinned to the disks 3, at 11 and may be spaced apart from each other in accordance with the length of sheets it is desired to score. As the flanges 6 and 7 are arranged upon the sieve cylinder in such a manner as to permit the cords 10 to be adjusted toward or away from each other, as desired, it will be understood that the pins 11 may be driven into the disks 3 at any point. As the paper film is formed on the sieve cylinder the cords 10, projecting above the periphery thereof, serve to score the pulp transversely thereof, as seen by dotted lines in Fig. 3.

The transversely scored pulp leaves the sieve cylinder, and in the usual course, reaches the press, indicated at 12, which forms the pulp into webs. The paper is conveyed from the press by the usual carrier 13, running in the direction of the arrow shown in Fig. 1, which passes through the press 12, and about a roller 14. The paper issues from the press 12 in the form of continuous strips, in a moistened condition, and is advanced toward the drying apparatus by a felt carrier 15 operating in the direction indicated by the arrow shown in Fig. 1. The felt 15 is carried by rollers 16 and 17 and is provided with a tightening roller 18. The paper is next delivered to the felt 19 of the drying apparatus, which is operated in the direction of the arrow, and is trained about roller 20, 21 and the drying roller 22, and the speed at which the felt 19 is driven exceeds the speed at which the felt 15 is driven. The usual cords 23 (one only being shown) coöperate with the felt 19 to carry the separate sheets to and about the drying roller 22.

The scored paper webs when discharged over the roller 17 will occupy the position shown in dotted lines at 24, as shown in Fig. 2. When the ends of the web fall into engagement with the felt 19 the increased speed thereof with respect to the felt 15 first draws the web into the position shown in dotted lines 25 in Fig. 3, and subsequently draws the web into the position shown in full lines. A roller 26, driven in a direction reverse to the travel of the webs is disposed between the rollers 17 and 21 and as the webs are brought into engagement with said roller 26, engagement thereof with the webs will impose sufficient strain upon the same to sub-divide them into sheets on the score lines, previously formed, but such tension will not be sufficient to sever the sheets between the score lines.

I claim:—

1. In a device of the class described, the combination of a sieve cylinder on which the pulp film is formed, of a plurality of elements on the periphery of said cylinder, for transversely scoring the pulp, a press for compressing the pulp into a web, a carrier felt for advancing the web from said press toward a drying mechanism, a device for frictionally engaging the web and separating it into sheets on the score lines, and a felt driven at an increased speed with respect to the speed of said felt carrier for bringing said web into engagement with said device.

2. A device of the class described, the combination of a sieve cylinder on which the pulp film is formed, of a plurality of elements on the periphery of said cylinder for transversely scoring the pulp, a press for compressing the pulp into a web, a carrier felt for advancing the web, a roller operated reversely to the direction of travel of the web, and a felt operative at an increased speed with respect to said felt carrier for engaging said web and bringing the same into engagement with said roller to sever the web into sheets.

3. A device of the class described, the combination of a sieve cylinder on which the pulp film is formed, of a plurality of elements on the periphery of said cylinder for transversely scoring the pulp, a press for compressing the pulp into the web, and means for severing the web into sheets on the score lines previously formed.

4. A device of the class described, the combination of means for transversely scoring the pulp film means for compressing the film into a web, and a roller operative reversely to the direction of travel of the web for engaging the same to sever it into sheets on the score-lines previously formed.

In testimony whereof I have signed my name to this specification in the presence of two subscribing witnesses.

CIRO BERTI.

Witnesses:
ERNEST SANTI,
MARTI SELVOTI.